(12) United States Patent
Zheng et al.

(10) Patent No.: US 10,320,927 B2
(45) Date of Patent: Jun. 11, 2019

(54) SYSTEMS AND METHODS FOR PROVIDING PERSONALIZED CONTENT

(71) Applicant: Facebook, Inc., Menlo Park, CA (US)

(72) Inventors: Chen Zheng, Cupertino, CA (US); Thomas Frederick Dimson, Stanford, CA (US); Linji Yang, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 197 days.

(21) Appl. No.: 15/299,035

(22) Filed: Oct. 20, 2016

(65) Prior Publication Data

US 2018/0115622 A1   Apr. 26, 2018

(51) Int. Cl.
| | |
|---|---|
| *G06N 7/00* | (2006.01) |
| *G06N 20/00* | (2019.01) |
| *G06Q 10/10* | (2012.01) |
| *G06Q 30/02* | (2012.01) |
| *G06Q 50/00* | (2012.01) |
| *H04L 12/58* | (2006.01) |
| *H04L 29/06* | (2006.01) |
| *H04L 29/08* | (2006.01) |

(52) U.S. Cl.
CPC ............ *H04L 67/22* (2013.01); *G06N 7/005* (2013.01); *G06N 20/00* (2019.01); *G06Q 10/10* (2013.01); *G06Q 30/0241* (2013.01); *G06Q 50/01* (2013.01); *H04L 51/10* (2013.01); *H04L 51/32* (2013.01); *H04L 65/4084* (2013.01); *H04L 67/06* (2013.01); *H04L 67/18* (2013.01)

(58) Field of Classification Search
CPC ...... G06Q 50/01; G06N 99/005; G06N 7/005; H04L 51/32; H04L 67/306; H04L 67/22
See application file for complete search history.

(56) References Cited

U.S. PATENT DOCUMENTS

| | | | | |
|---|---|---|---|---|
| 7,143,054 | B2 * | 11/2006 | Doherty | ................. G06Q 30/02 705/7.33 |
| 8,825,759 | B1 * | 9/2014 | Jackson | .................. H04L 67/02 705/14.69 |
| 9,146,894 | B2 * | 9/2015 | Piepgrass | .......... G06F 15/17306 |
| 9,317,812 | B2 * | 4/2016 | Kabiljo | ................ G06N 99/005 |
| 9,984,330 | B2 * | 5/2018 | Veeraragavan | .......... G06N 5/04 |
| 2004/0220850 | A1 * | 11/2004 | Ferrer | .................... G06Q 30/02 705/14.66 |
| 2008/0256233 | A1 * | 10/2008 | Hall | ...................... G06Q 30/02 709/224 |
| 2009/0183210 | A1 * | 7/2009 | Andrade | .......... G06F 17/30817 725/87 |

(Continued)

*Primary Examiner* — David R Lazaro
(74) *Attorney, Agent, or Firm* — Sheppard Mullin Richter & Hampton LLP

(57) ABSTRACT

Systems, methods, and non-transitory computer-readable media can generate a set of candidate content items from a plurality of content items that are available in the social networking system, wherein one or more of the candidate content items are to be included in a personalized content stream for a first user. A corresponding score for each of the candidate content items can be generated with respect to the first user. A first set of content items can be determined from the set of candidate content items based at least in part on the respective scores, wherein content items in the first set are included in the personalized content stream.

20 Claims, 11 Drawing Sheets

(56) References Cited

U.S. PATENT DOCUMENTS

| | | | |
|---|---|---|---|
| 2009/0319359 A1* | 12/2009 | Soza | G06Q 30/02 705/14.25 |
| 2010/0217720 A1* | 8/2010 | Jones | G06Q 30/02 705/319 |
| 2011/0258049 A1* | 10/2011 | Ramer | G06F 17/30867 705/14.66 |
| 2011/0289090 A1* | 11/2011 | Zhou | G06F 17/30693 707/740 |
| 2012/0226564 A1* | 9/2012 | Mirrokni Banadaki | G06Q 30/0254 705/14.66 |
| 2013/0103758 A1* | 4/2013 | Alison | G06Q 30/02 709/204 |
| 2013/0212173 A1* | 8/2013 | Carthcart | G06Q 50/01 709/204 |
| 2014/0172875 A1* | 6/2014 | Rubinstein | G06F 17/30867 707/748 |
| 2014/0172876 A1* | 6/2014 | Rubinstein | G06F 17/30867 707/748 |
| 2014/0172877 A1* | 6/2014 | Rubinstein | G06F 17/30867 707/748 |
| 2015/0213372 A1* | 7/2015 | Shah | H04L 12/58 706/12 |
| 2015/0317357 A1* | 11/2015 | Harmsen | G06F 17/30424 707/723 |
| 2015/0347917 A1* | 12/2015 | Hua | G06N 5/048 706/52 |
| 2017/0061286 A1* | 3/2017 | Kumar | G06Q 10/00 |
| 2017/0124071 A1* | 5/2017 | Huang | G06F 17/2818 |
| 2017/0186101 A1* | 6/2017 | Kapoor | G06Q 50/01 |
| 2017/0262445 A1* | 9/2017 | Jeon | G06F 17/3053 |
| 2018/0060739 A1* | 3/2018 | Saha | G06Q 50/01 |
| 2018/0060747 A1* | 3/2018 | Ghosh | H04L 67/306 |
| 2018/0060749 A1* | 3/2018 | Yan | G06N 7/005 |
| 2018/0060756 A1* | 3/2018 | Saha | G06N 99/005 |
| 2018/0115622 A1* | 4/2018 | Zheng | H04L 67/22 |
| 2018/0115630 A1* | 4/2018 | Zheng | H04L 67/327 |
| 2018/0121964 A1* | 5/2018 | Zhang | G06Q 30/0269 |
| 2018/0139293 A1* | 5/2018 | Dimson | H04L 67/22 |

* cited by examiner

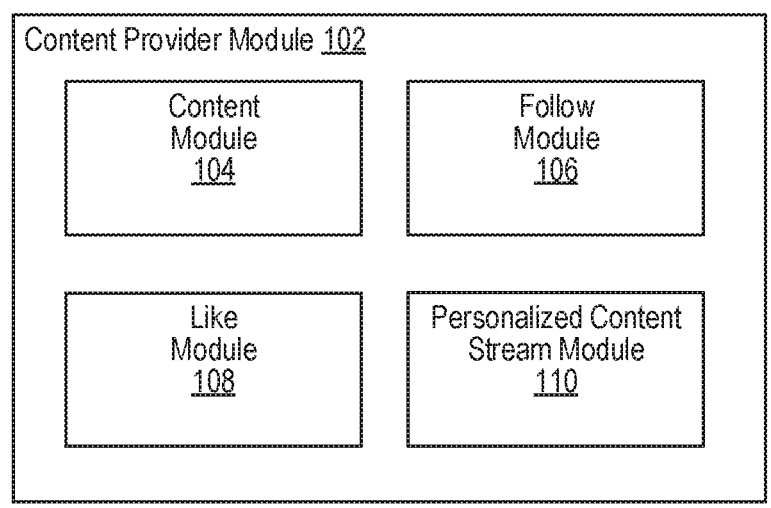
FIGURE 1

600

Obtain information describing a personalized content stream of a first user, the personalized content stream including a set of content items to be presented to the first user according to a first ordering
602

Determine a second ordering for the set of content items based on one or more criteria, the second ordering satisfying at least one measure of consistency
604

Modify the personalized content stream to correspond to the second ordering
606

FIGURE 6

SYSTEMS AND METHODS FOR PROVIDING PERSONALIZED CONTENT

FIELD OF THE INVENTION

The present technology relates to the field of content provision. More particularly, the present technology relates to techniques for providing personalized content to users.

BACKGROUND

Today, people often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

Under conventional approaches, users may post various content items to the social networking system. In general, content items posted by a first user can be included in the respective content feeds of other users of the social networking system, for example, that have "followed" the first user. By following (or subscribing to) the first user, some or all content that is produced, or posted, by the first user may be included in the respective content feeds of the following users. A user following the first user can simply unfollow the first user to prevent new content that is produced by the first user from being included in the following user's content feed.

SUMMARY

Various embodiments of the present disclosure can include systems, methods, and non-transitory computer readable media configured to generate a set of candidate content items from a plurality of content items that are available in the social networking system, wherein one or more of the candidate content items are to be included in a personalized content stream for a first user. A corresponding score for each of the candidate content items can be generated with respect to the first user. A first set of content items can be determined from the set of candidate content items based at least in part on the respective scores, wherein content items in the first set are included in the personalized content stream.

In some embodiments, the systems, methods, and non-transitory computer readable media are configured to determine a likelihood of the first user selecting an option to like a candidate content item through the social networking system, the likelihood being determined using a trained machine learning model, wherein the score for the candidate content item is based at least in part on the likelihood.

In some embodiments, the systems, methods, and non-transitory computer readable media are configured to determine a likelihood of the first user watching one or more additional content items after having viewed a candidate content item, the likelihood being determined using a trained machine learning model, wherein the score for the candidate content item is based at least in part on the likelihood.

In some embodiments, the systems, methods, and non-transitory computer readable media are configured to determine a likelihood of the first user watching a candidate content item to completion, the likelihood being determined using a trained machine learning model, wherein the score for the candidate content item is based at least in part on the likelihood.

In some embodiments, the systems, methods, and non-transitory computer readable media are configured to determine a likelihood of the first user watching a playback of a candidate content item for a duration of time that is longer than an average duration of time the first user watches playbacks of content items, the likelihood being determined using a trained machine learning model, wherein the score for the candidate content item is based at least in part on the likelihood.

In some embodiments, the systems, methods, and non-transitory computer readable media are configured to determine a likelihood of the first user watching a playback of a candidate content item for a duration of time that is longer than an average duration of time that other users watched playbacks of the candidate content item, the likelihood being determined using a trained machine learning model, wherein the score for the candidate content item is based at least in part on the likelihood.

In some embodiments, the systems, methods, and non-transitory computer readable media are configured to obtain one or more content items that were liked by at least one second user that the first user is following in the social networking system.

In some embodiments, the systems, methods, and non-transitory computer readable media are configured to determine that the first user has previously liked one or more content items that were posted by at least one second user and obtain one or more content items that were liked by the second user.

In some embodiments, the systems, methods, and non-transitory computer readable media are configured to obtain one or more content items that were posted by users that are located in a geographic region in which the first user is also located or has visited.

In some embodiments, the systems, methods, and non-transitory computer readable media are configured to filter the set of candidate content items to exclude content items that are likely to be flagged by users as being inappropriate or content items that were posted by users that have previously been flagged as posters of inappropriate content.

Various embodiments of the present disclosure can include systems, methods, and non-transitory computer readable media configured to obtain information describing a personalized content stream of a first user, the personalized content stream including a set of content items to be presented to the first user according to a first ordering. A second ordering for the set of content items is determined based on one or more criteria, the second ordering satisfying at least one measure of consistency. The personalized content stream is modified to correspond to the second ordering.

In some embodiments, the systems, methods, and non-transitory computer readable media are configured to cluster content items in the set based on one or more criteria, wherein each content item is assigned to a cluster in a plurality of clusters and determine an order in which to present each cluster in the plurality of clusters.

In some embodiments, the systems, methods, and non-transitory computer readable media are configured to determine a respective classification for each content item in the set and assign each content item in the set to a cluster in the plurality of clusters based on its respective classification.

In some embodiments, the classification of a content item is based on its assigned topic, category, sub-category, subject matter classification, or visual theme.

In some embodiments, the systems, methods, and non-transitory computer readable media are configured to determine a respective geographic location for each content item in the set, the geographic location corresponding to a geographic location of a user that posted the content item and assign each content item in the set to a cluster in the plurality of clusters based on its respective geographic location.

In some embodiments, the systems, methods, and non-transitory computer readable media are configured to determine a respective sound characteristics for each content item in the set and assign each content item in the set to a cluster in the plurality of clusters based on its respective sound characteristics.

In some embodiments, the systems, methods, and non-transitory computer readable media are configured to determine respective attributes describing music that is played during playback of each content item in the set and assign each content item in the set to a cluster in the plurality of clusters based on the respective attributes describing the music played during playback of the content item.

In some embodiments, the systems, methods, and non-transitory computer readable media are configured to determine respective distance scores between clusters in the plurality of clusters, wherein a distance score for a first cluster and a second cluster measures a similarity between the first cluster and the second cluster and generate the order of clusters in the plurality of clusters based at least in part on the respective distance scores.

In some embodiments, the distance score for the first cluster and the second cluster is determined based at least in part on a visual similarity between content items in the first cluster and content items in the second cluster.

In some embodiments, the distance score for the first cluster and the second cluster is determined based at least in part on a social affinity between users that posted content items in the first cluster and users that posted content items in the second cluster.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 1 illustrates an example system including an example content provider module, according to an embodiment of the present disclosure.

FIG. 6 illustrates an example method for reordering a personalized content stream, according to an embodiment of the present disclosure.

Figure 2:
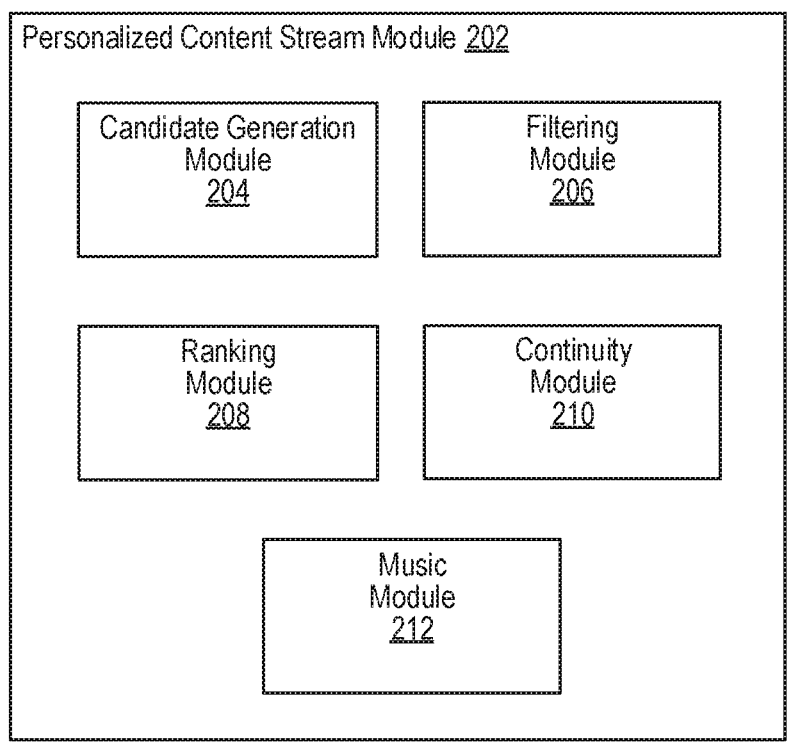
FIG. 2 illustrates an example personalized content stream module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Providing Personalized Content

People often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

Under conventional approaches, users may post various content items to the social networking system. In general, content items posted by a first user can be included in the respective content feeds of other users of the social networking system that have "followed" the first user. By following (or subscribing to) the first user, some or all content that is produced, or posted, by the first user may be included in the respective content feeds of the users following the first user. A user following the first user can prevent new content from the first user from being included in the user's content feed by simply "unfollowing" the first user. Under conventional approaches, there may be instances when a user does not follow enough users to result in a desired amount of new content to be included in the user's content feed. In one example, the user may follow a limited number of other users that post new content items infrequently. In this example, the user may be left with a stale content feed once the content items posted by that limited number of users have been exhausted, or viewed, by the user. As a result, the user's continued engagement with the social networking system may be negatively affected.

An improved approach rooted in computer technology overcomes the foregoing and other disadvantages associated with conventional approaches specifically arising in the realm of computer technology. In various embodiments, users of the social networking system can access content streams that have been personalized for the user. Such content streams may include various types of content items that each have been determined to be relevant, or of interest, to a given user. In general, a personalized content stream can be composed using a number of individual content items that have been posted by various users of the social networking system. In various embodiments, the personalized content stream for a user can be continually updated to include newly posted content items that have been determined to be relevant to the user. As a result, the personalized content stream can provide an continuous stream of relevant various content items that are available for the user to browse. In some embodiments, such personalized content stream can further be customized to improve the user experience. For example, the presentation of content items as part of the personalized content stream may be reordered based on topic, theme (e.g., visual theme, audio theme, etc.), motion, geographic location, and sound, to name some examples.

FIG. 1 illustrates an example system 100 including an example content provider module 102, according to an embodiment of the present disclosure. As shown in the example of FIG. 1, the content provider module 102 can include a content module 104, a follow module 106, a like module 108, and a personalized content stream module 110. In some instances, the example system 100 can include at least one data store 112. The components (e.g., modules, elements, etc.) shown in this figure and all figures herein are exemplary only, and other implementations may include additional, fewer, integrated, or different components. Some components may not be shown so as not to obscure relevant details.

In some embodiments, the content provider module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content provider module 102 can be implemented, in part or in whole, as software running on one or more computing devices or systems, such as on a user or client computing device. In one example, the content provider module 102 or at least a portion thereof can be implemented as or within an application (e.g., app), a program, or an applet, etc., running on a user computing device or a client computing system, such as the user device 710 of FIG. 7. In another example, the content provider module 102 or at least a portion thereof can be implemented using one or more computing devices or systems that include one or more servers, such as network servers or cloud servers. In some instances, the content provider module 102 can, in part or in whole, be implemented within or configured to operate in conjunction with a social networking system (or service), such as the social networking system 730 of FIG. 7.

The content provider module 102 can be configured to communicate and/or operate with the at least one data store 112, as shown in the example system 100. The at least one data store 112 can be configured to store and maintain various types of data. For example, the data store 112 can store information describing various content that has been posted by users of a social networking system. In some implementations, the at least one data store 112 can store information associated with the social networking system (e.g., the social networking system 730 of FIG. 7). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 112 can store information associated with users, such as user identifiers, user information, profile information, user specified settings, content produced or posted by users, and various other types of user data.

The content provider module 102 can be configured to provide users with access to content that is posted through a social networking system. For example, the content module 104 can provide a first user with access to content items through an interface that is provided by a software application (e.g., a social networking application) running on a computing device of the first user. The first user can also interact with the interface to post content items to the social networking system. Such content items may include text, images, audio, and videos, for example.

In various embodiments, other users of the social networking system can access content items posted by the first user. In one example, the other users can access the content items by searching for the first user through the interface, for example, by user name. In some instances, some users may want to see content items posted by the first user in their respective content feed. To cause content items posted by the first user to be included in their respective content feed, a user can select an option through the interface to subscribe to, or "follow", the first user. The follow module 106 can process the user's request by identifying the user as a follower of (or "friend" of) the first user in the social networking system. As a result, some or all content items that are posted by the first user can automatically be included in the respective content feed of the user. If the user decides that they no longer want to see content from the first user in their respective content feed, the user can select an option through the interface to "unfollow" the first user. As a result, the follow module 106 can remove the association between the user and the first user so that content items posted by the first user are no longer included in the content feed of the user. In some instances, the user may want to endorse, or "like", a content item. In such instances, the user can select an option provided in the interface to like the desired content item. The like module 108 can determine when a user likes a given content item and can store information describing this relationship. In some embodiments, this information can be stored in a social graph as described in reference to FIG. 7.

In various embodiments, the personalized content stream module 110 is configured to generate customized content streams for users using content items that are available from various sources including any content items that are posted through the social networking system. More details regarding the personalized content stream module 110 will be provided below with reference to FIG. 2.

FIG. 2 illustrates a personalized content stream module 202, according to an embodiment of the present disclosure. In some embodiments, the personalized content stream module 110 of FIG. 1 can be implemented with the personalized content stream module 202. As shown in the example of FIG. 2, the personalized content stream module 202 can include a candidate generation module 204, a filtering module 206, a ranking module 208, a continuity module 210, and a music module 212.

In various embodiments, the personalized content stream module 202 can generate respective content streams for users. In some embodiments, each personalized content stream is tailored for a given user. That is, the personalized content stream will generally include content items that have been determined to be of interest to the user based, in part, on various metrics. As mentioned, such personalized content streams may be composed using various types of content items (e.g., animated content, videos, etc.) that are posted, or otherwise available, through the social networking system.

When generating a personalized content stream for a first user, the candidate generation module 204 can determine a set of candidate content items that are eligible for inclusion in the personalized content stream. In some embodiments, the candidate generation module 204 identifies as candidates any content items that were liked by users that are being followed by the first user. For example, if a second user that is being followed by the first user likes a content item, then that content item can be included in the set of candidate content items. In some embodiments, the candidate generation module 204 identifies as candidates any content items that were liked by users whose content items were previously liked by the first user. For example, if the first user liked a first content item that was posted by a second user and the second user likes a second content item, then the second content item can be included in the set of candidate content items. In some embodiments, the candidate generation module 204 identifies as candidates any content items that were posted by users that were referenced in one or more search queries that were submitted by the first user to the social networking system. For example, the first user may have submitted search queries that reference a second user to view the second user's profile and/or content items that have been posted by the second user. In this example, any content items posted by the second user can be included in the set of candidate content items. In some embodiments, the candidate generation module 204 identifies as candidates any content items that were posted by users that were referenced in one or more search queries that were submitted by a threshold number of users of the social networking system.

In some embodiments, the candidate generation module 204 identifies as candidates any content items that were posted by users located in a geographic region (e.g., a point of interest, city, zip code, state, country, continent, geofence, etc.) in which the first user is also located and/or has visited in the past. Such location information may be obtained, for example, from computing devices of users that are used to access the social networking system, metadata corresponding to content items that were posted by users, and/or information provided by users in their respective social profiles in the social networking system, to name some examples. In some embodiments, the candidate generation module 204 identifies as candidates any content items that were posted by users that are located in a geographic region in which users that are followed by the first user (e.g., friends of the first user) are located. For example, a content item posted by a third user can be included in the set of candidates if the third user is located in the same geographic region as a second user that is followed by the first user.

In some embodiments, the candidate generation module 204 generates a new set of candidate content items when one or more criteria is satisfied. For example, the candidate generation module 204 can generate a new set of candidate content items at predetermined time intervals or after the first user has accessed, or viewed, a threshold number (e.g., 10 content items) of content items in the personalized content stream. In some embodiments, when generating a new set of candidate content items for a user, the candidate generation module 204 may discard content items included in the previous set of candidate content items that were determined for the user. In some embodiments, content items included in the previous set of candidate content items are evaluated with respect to any new candidate content items to identify the best scoring content items to be included in the user's personalized content stream.

The filtering module 206 can be configured to refine the set of candidate content items by removing any content items that satisfy certain filtering criteria. For example, in some embodiments, content items included in the set may be restricted to a certain type of content item (e.g., videos). In such embodiments, any content items that do not match this type (e.g., images) are removed from the set of candidate content items. In some embodiments, a machine learning model can be trained to predict whether a content item should be removed from the set of candidate content items. In some embodiments, the model can be trained using training examples that each reference content items that have been hand labeled by quality control personnel as bad content that should be excluded. Once trained, the model can then predict whether a given content item should be excluded from the set of candidate content items, for example, based on the subject matter reflected in the content item. For example, a content item may be excluded if the content item includes objectionable content (e.g., nudity, violence, etc.) or the content item is likely to be reported as being inappropriate. In another example, a content item may be excluded if a threshold number of users have skipped viewing the content item and/or have reported the content item as being inappropriate. A content item can also be excluded if the content item was posted from a user account that has previously been determined to post bad content, for example.

In some embodiments, the model can be trained using feedback collected from users during their interactions with content items in the social networking system. For example, content items may be classified into one or more categories (e.g., games, news, comedy, film, travel, sports, music, etc.) and/or sub-categories using generally known content classification techniques (e.g., subject matter classification). In such embodiments, user feedback (e.g., likes, dislikes or skips, etc.) for content items can be collected and used to train the model to predict likelihoods of a user "liking" a content item, of the user skipping playback of the content item, and/or of the user discontinuing the viewing of a personalized content stream in which the content item is included. The filtering module 206 may exclude a content item if any of these likelihoods satisfy a threshold value.

After filtering, the remaining content items in the set of candidate content items can be scored and ranked for presentation in the personalized content stream. In various embodiments, the ranking module 208 can score each content item in the set with respect to the first user using one or more trained machine learning models. In some embodiments, a model can be trained to predict a likelihood that the first user will "like" a given content item. For example, the model can be trained using feedback collected from the first user with respect to various content items and their respective classifications, as described above. In some embodiments, the software application running on the first user's computing device through which the social networking system is accessed may be configured to send information describing which content items the first user has viewed, a respective view duration for each content item, and/or a sequence in which the content items were viewed, to name some examples. Such information can be used to further train the model as described below.

For example, in some embodiments, the model can be trained to predict a likelihood that the first user will continue to watch more content items included in the personalized content stream after viewing a given content item. In such embodiments, the training examples used to train the model can each reference a content item viewed by the first user and indicate whether the first user continued watching a threshold number of content items that were subsequently presented to the first user in the personalized content stream. In some embodiments, the model can be trained to predict a likelihood that the first user will watch a given content item to completion. In such embodiments, the training examples used to train the model can each reference a type and/or classification for a content item that was presented to the first user and indicate whether the first user watched the content item to completion. Depending on the implementation, a content item may be deemed as being watched to completion if the first user views the entire duration of the content item or views the content item for some threshold period of time (e.g., 3 seconds). In some embodiments, a view count associated with the first user is incremented after the first user has watched a content item to completion. In some embodiments, the first user may be associated with multiple view counts that each correspond to a particular type and/or classification of content item. In such embodiments, the view count incremented after the first user watches a content item to completion corresponds to the type and/or classification of the content item.

In some embodiments, the model can be trained to predict a likelihood that the first user will watch the playback of a given content item for a duration that is longer than an average duration the first user typically views content items (e.g., before discontinuing the playback, closing the software application, etc.). In such embodiments, the training examples used to train the model can each reference a type and/or classification for a content item that was presented to the first user and indicate whether the first user watched the content item for a duration that is longer than the average duration. In some embodiments, the model can be trained to predict a likelihood that the user will watch the playback of a given content item for a duration that is longer than an average duration that other users viewed the content item.

In various embodiments, a content item can be scored with respect to the first user using any one of the approaches described above or any combination thereof. When using multiple approaches to score a content item, the respective likelihoods that measure the first user's behavior can be combined (e.g., summed, multiplied, etc.) to produce an overall score for the content item. In some embodiments, the respective likelihoods may be weighted differently, for example, by assigning respective coefficients to the likelihoods.

In some embodiments, the model(s) can be trained to output likelihoods that are specific for a given user. That is, a model can output a likelihood that was predicted for a given user based on feedback and/or information corresponding to that user. In some embodiments, users are classified into one or more groups and the model(s) are trained to output likelihoods that are group-specific. That is, a model can output a likelihood that was predicted for a given user based on feedback and/or information corresponding to a group of users to which the given user was assigned. In one example, users that have exhibited similar patterns of interactions (e.g., users that follow similar users, users that like similar content items, etc.) in the social networking system may be included in the same group. In another example, users may be grouped together based on their age range, gender, life stage (e.g., user is enrolled in high school, user is enrolled in a university, user is at some stage of their career, user is retired, etc.), shared attributes among some proportion of users followed by the user (e.g., users that tend to follow athletes, etc.), location, language preference, to name some examples.

Once content items in the set of candidate content items have been scored, the ranking module 208 can rank the content items based on their respective scores. In some embodiments, the ranking module 208 selects a threshold number (e.g., 20) of the top scoring content items to be included in the personalized content stream for the first user.

This personalized content stream may be accessible to the user through an interface as described below in reference to FIGS. 3 and 4A-C.

In general, the content items included in the personalized content stream have been determined to be relevant to the first user. However, in an effort to improve consistency between content item transitions, in some embodiments, the continuity module 210 is configured to modify the order in which content items in the personalized content stream are presented. For example, the continuity module 210 can cluster content items in the personalized content stream using one or more criteria. In some embodiments, content items having the same classification (e.g., topic, category, sub-category, subject matter classification, visual theme, etc.) can be included in the same cluster. In some embodiments, content items that were posted by users located in the same geographic region or within some threshold distance of one another can be included in the same cluster. In some embodiments, content items having similar sound characteristics (e.g., audio is within a threshold volume range, decibel range, frequency range, etc.) can be included in the same cluster. For example, content items that are associated with audio that satisfies a threshold sound level consistency can be included in the same cluster. In some embodiments, content items having the same music and/or song are included in the same cluster. In some embodiments, content items having similar music (e.g., same genre) are included in the same cluster. In some embodiments, content items having similar motion characteristics (e.g., having frame rates within a threshold range) can be included in the same cluster. In some embodiments, a first content item and a second content item can be included in the same cluster if a threshold number of people continue to watch playback of the second content item after playback of the first content item ends.

The continuity module 210 can then determine the order in which the clusters of content items will be presented in the personalized content stream. In some embodiments, the continuity module 210 determines the order based on respective distance scores between the clusters. A distance score between a first cluster and a second cluster may be computed using any of the approaches described herein or any combination thereof. In some embodiments, when computing a distance score between a first cluster and a second cluster, the continuity module 210 can measure respective distances between one or more content items in the first cluster with respect to one or more content items in the second cluster. For example, a distance score between a first cluster and a second cluster may be determined based on a visual similarity between content items in the first cluster and content items in the second cluster. In another example, a distance score between a first cluster and a second cluster may be determined based on a language similarity (e.g., language spoken during playback of the content items, language corresponding to text shown during playback of the content item, etc.) between content items in the first cluster and content items in the second cluster. In another example, a distance score between a first cluster and a second cluster may be determined based on a social affinity between users that posted content items in the first cluster and users that posted content items in the second cluster. The social affinity may be determined using a social graph that is managed by the social networking system, for example. In such embodiments, content items posted by users having a strong social affinity will be closer in distance.

The continuity module 210 can order the clusters based on the distance scores. For example, a distance score between a first cluster and a second cluster may be lower than a distance score between the first cluster and a third cluster. In this example, the personalized stream can be ordered so content items in the second cluster are presented after playback of the content items in the first cluster.

In some embodiments, the music module 212 can be configured to identify background music, or songs, to be played during playback of the personalized content stream. For example, the music module 212 can identify any songs that will be played during playback of the content items included in the personalized content stream. The music module 212 can then select one or more of the identified songs to be played during playback of content items in the personalized content stream. In some embodiments, the songs to be played are selected randomly. In some embodiments, the songs to be played may be determined based on whether the first user will like the song(s). For example, these may be songs that were written and/or performed by artists that are followed by the first user in the social networking system. In another example, the songs to be played may have been written and/or performed by artists that are local to the geographic region in which the first user is located. In some embodiments, the music module 212 can select one or more songs to be played during playback of a cluster of content items. For example, the music module 212 can identify any songs that will be played during playback of the content items included in a cluster. The music module 212 can then select one or more of the identified songs to be played during playback of content items in the cluster using any of the approaches described above. In some embodiments, when a song is being played during playback of the content items, all other sound associated with the content items is muted. In some embodiments, sound associated with the content items is played at a lower volume setting while the song being played during playback of the content items is played at a higher volume setting.

Figure 3A:
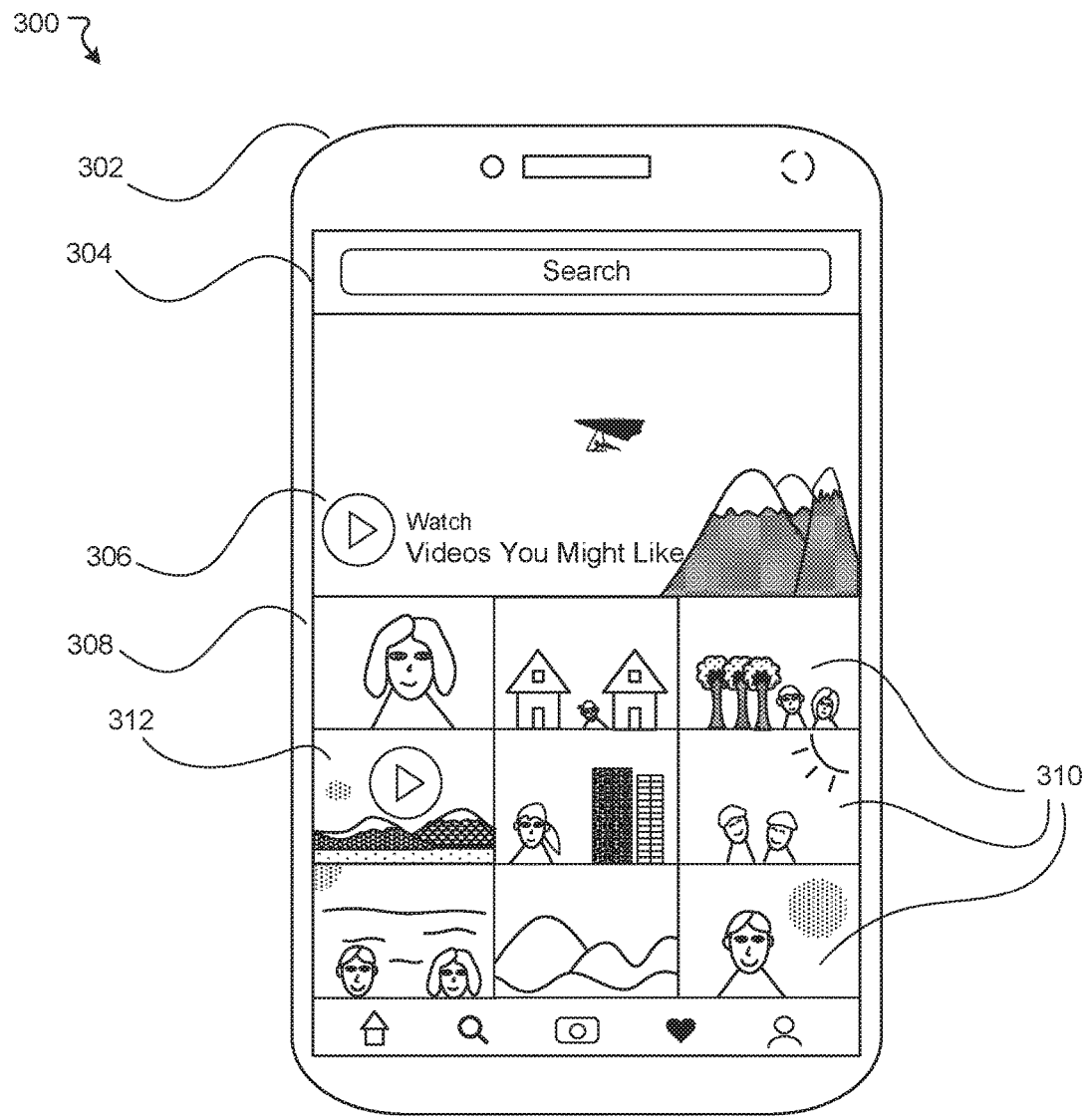
FIGS. 3A-B illustrates an example interface, according to an embodiment of the present disclosure.
Figure 3B:
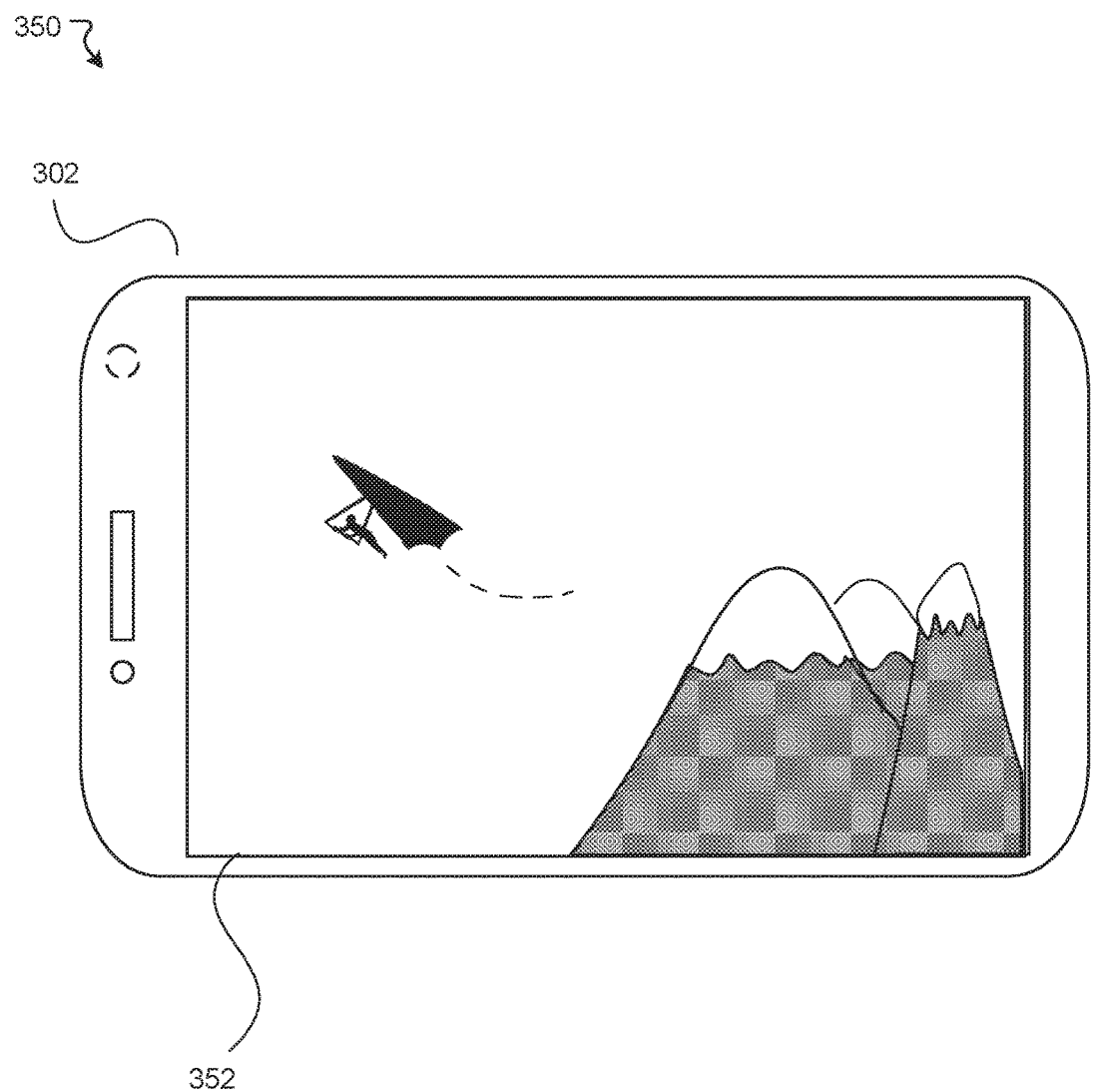

FIG. 3A illustrates an example 300 of an interface 304, according to an embodiment of the present disclosure. In this example, the interface 304 is presented through a display screen of the computing device 302. Further, the interface 304 may be provided through an application (e.g., a web browser, a social networking application, messenger application, etc.) running on the computing device 302 that is configured to interact with a social networking system. The interface 304 includes a number of different options for accessing content through the social networking system. In some embodiments, the interface 304 includes a first region through which a user operating the computing device 302 can access a personalized content stream 306 (e.g., "Videos You Might Like"). In some embodiments, the personalized content stream 306 begins playing automatically in the first region as soon as the interface 304 is displayed. The interface 304 can also include a second region through which a grid 308 of content items (e.g., content items 310) can be accessed. For example, the user can select any of the content items in the grid 308 to access the corresponding content item. In some embodiments, one or more different personalized content streams 312 that were generated for the user can be included as a selectable content item in the grid 308. In some embodiments, upon selecting the option 306, the software application can be configured to provide an immersive interface 352 to allow full screen playback of the content items in the personalized content stream, as illustrated in the example of FIG. 3B.

Figure 4A:
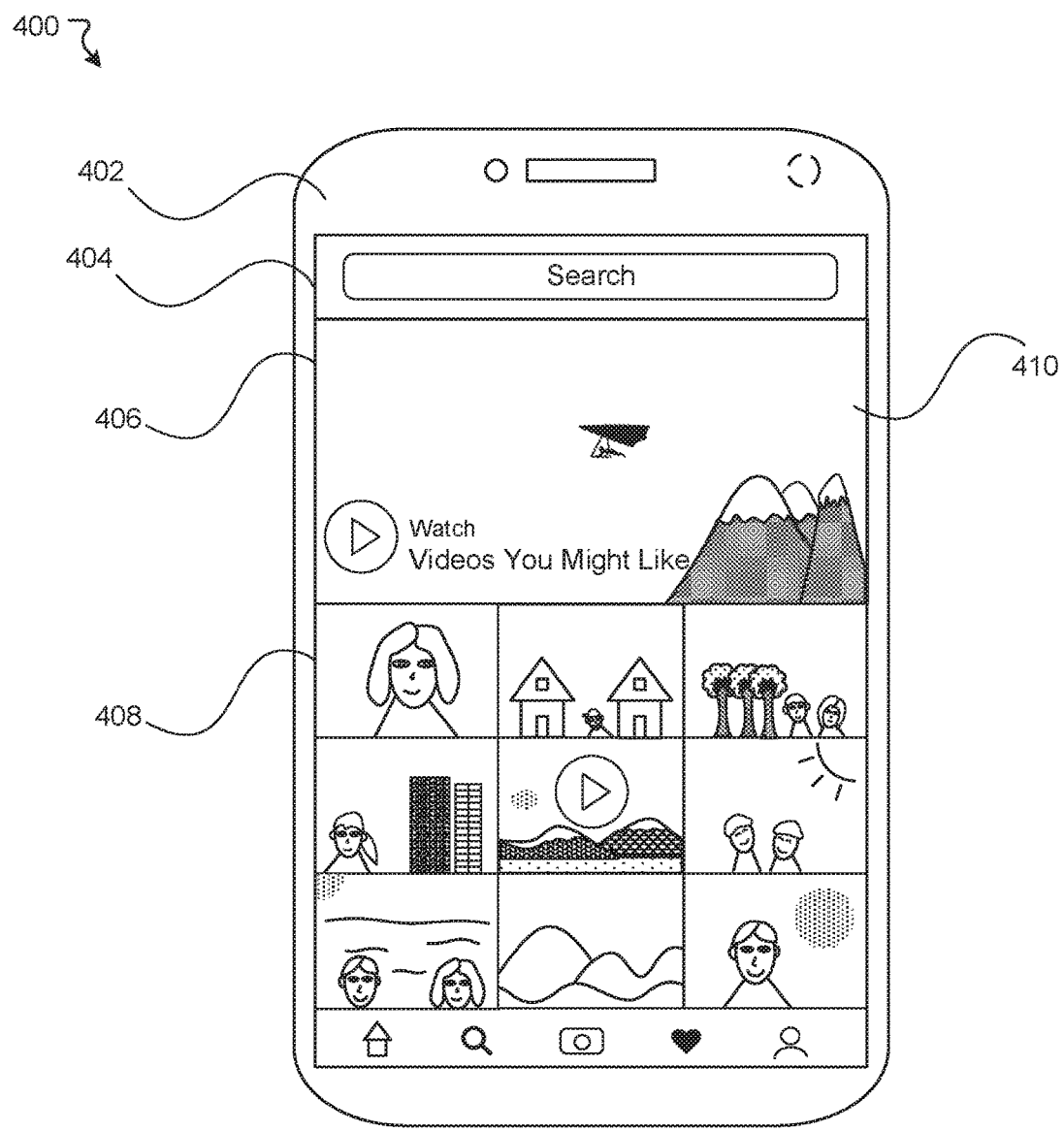
FIGS. 4A-C illustrate other example interfaces, according to an embodiment of the present disclosure.
Figure 4B:
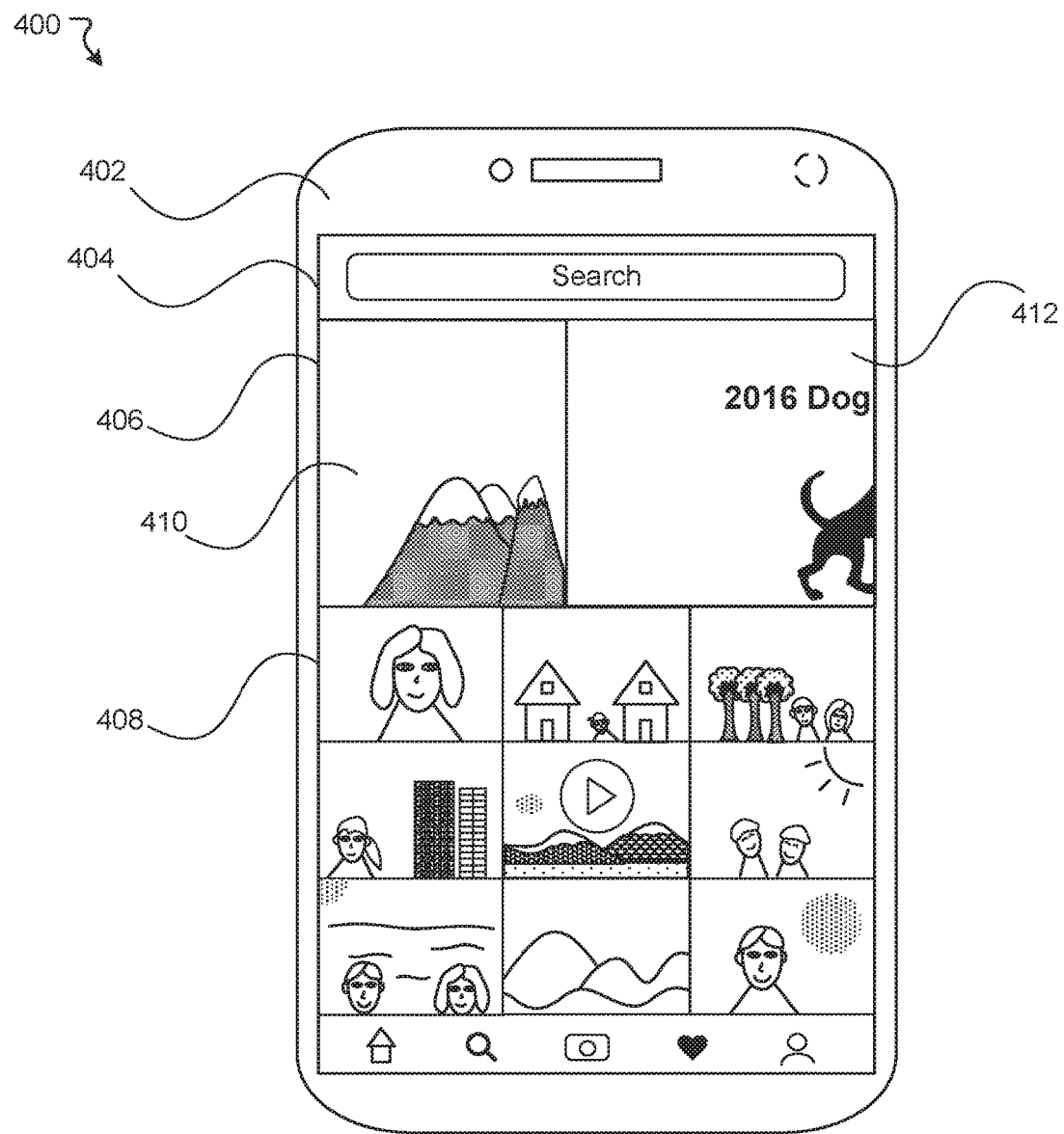
Figure 4C:
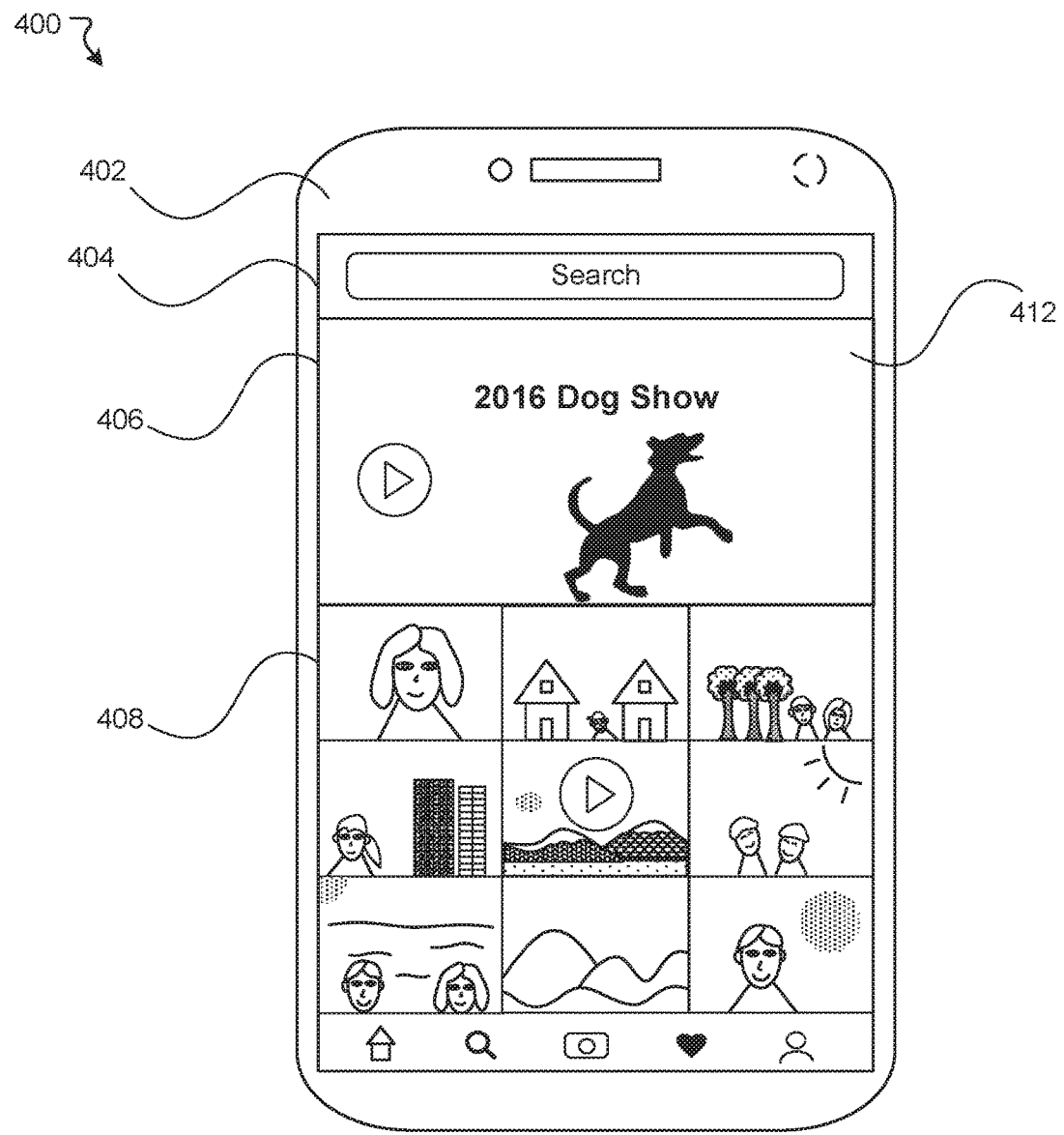

FIG. 4A illustrates another example 400 of an interface 404, according to an embodiment of the present disclosure. In this example, the interface 404 is presented through a display screen of a computing device 402. Further, the interface 404 may be provided through an application (e.g., a web browser, a social networking application, messenger application, etc.) running on the computing device 402 that is configured to interact with a social networking system. The interface 404 includes a first region that presents a carousel 406 of content items that are available for playback. In FIG. 4A, the carousel 406 is shown referencing the personalized content stream 410. The carousel 406 can include both personalized content streams as well as curated content items. The interface 404 can also include a second region through which a grid 408 of content items can be accessed, as described above. The carousel 406 can cycle through different content items that are available for selection as illustrated in FIG. 4B. In FIG. 4B, the carousel 406 is shown transitioning from referencing the personalized content stream 410 to a curated content item 412. Once the transitioning is complete, the carousel 406 can reference just the curated content item 412 for selection, as illustrated in the example of FIG. 4C.

Figure 5:
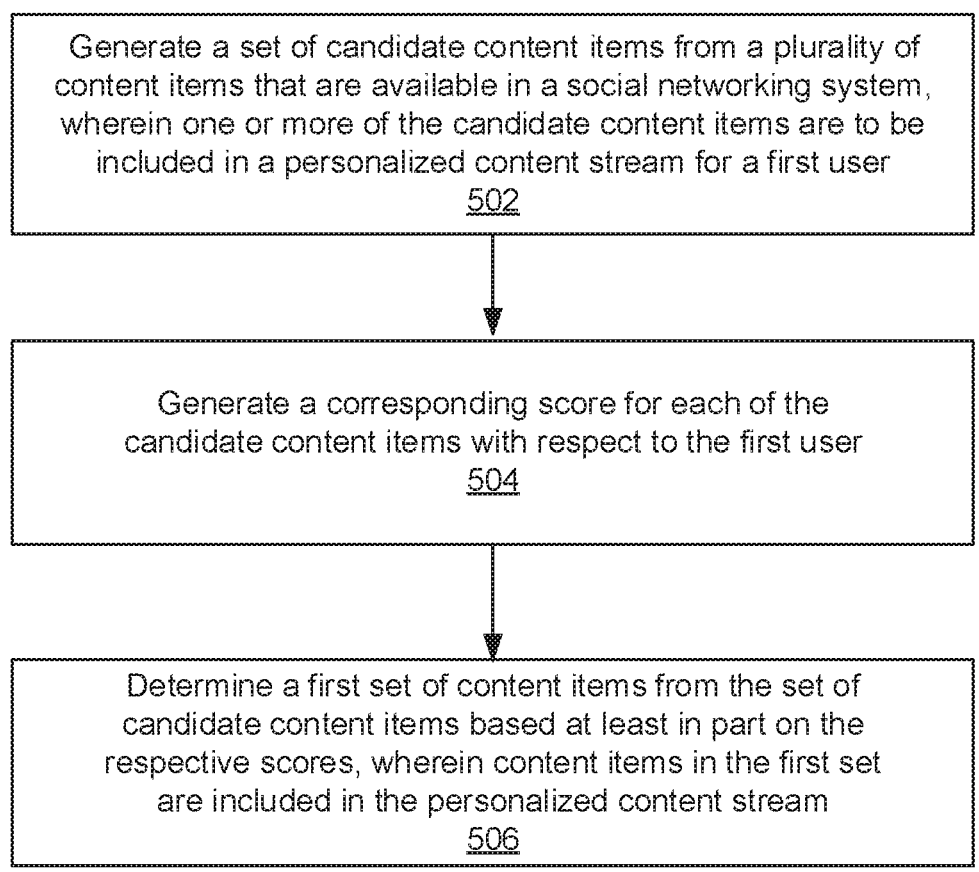
FIG. 5 illustrates an example method for providing personalized content, according to an embodiment of the present disclosure.

FIG. 5 illustrates an example method 500 for providing personalized content, according to an embodiment of the present disclosure. It should be appreciated that there can be additional, fewer, or alternative steps performed in similar or alternative orders, or in parallel, within the scope of the various embodiments discussed herein unless otherwise stated.

At block 502, a set of candidate content items is generated from a plurality of content items that are available in the social networking system, wherein one or more of the candidate content items are to be included in a personalized content stream for a first user. At block 504, a corresponding score for each of the candidate content items is generated with respect to the first user. At block 506, a first set of content items is determined from the set of candidate content items based at least in part on the respective scores, wherein content items in the first set are included in the personalized content stream.

FIG. 6 illustrates an example method 600 for reordering a personalized content stream, according to an embodiment of the present disclosure. It should be appreciated that there can be additional, fewer, or alternative steps performed in similar or alternative orders, or in parallel, within the scope of the various embodiments discussed herein unless otherwise stated.

At block 602, information describing a personalized content stream of a first user is obtained. The personalized content stream can include a set of content items to be presented to the first user according to a first ordering. At block 604, a second ordering for the set of content items is determined based on one or more criteria. The second ordering satisfies at least one measure of consistency. At block 606, the personalized content stream is modified to correspond to the second ordering.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 7:
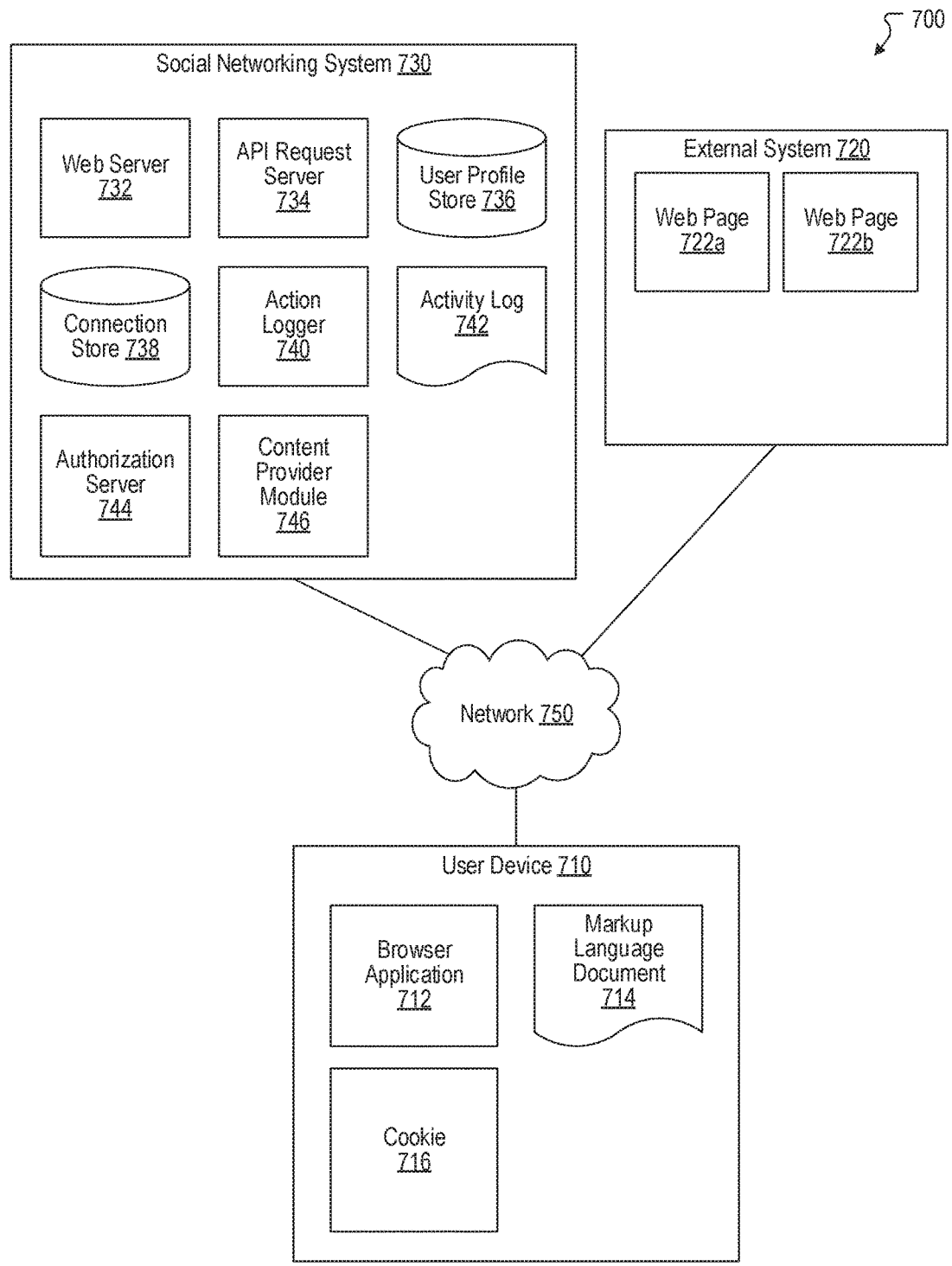
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the Silverlight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content. As discussed previously, it should be appreciated that there can be many variations or other possibilities.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the social networking system 730 can include a content provider module 746. The content provider module 746 can, for example, be implemented as the content provider module 102 of FIG. 1. In some embodiments, the content provider module 746, in whole or in part, may be implemented in a user device 710 or the external system 720. As discussed previously, it should be appreciated that there can be many variations or other possibilities.

Hardware Implementation

Figure 8:
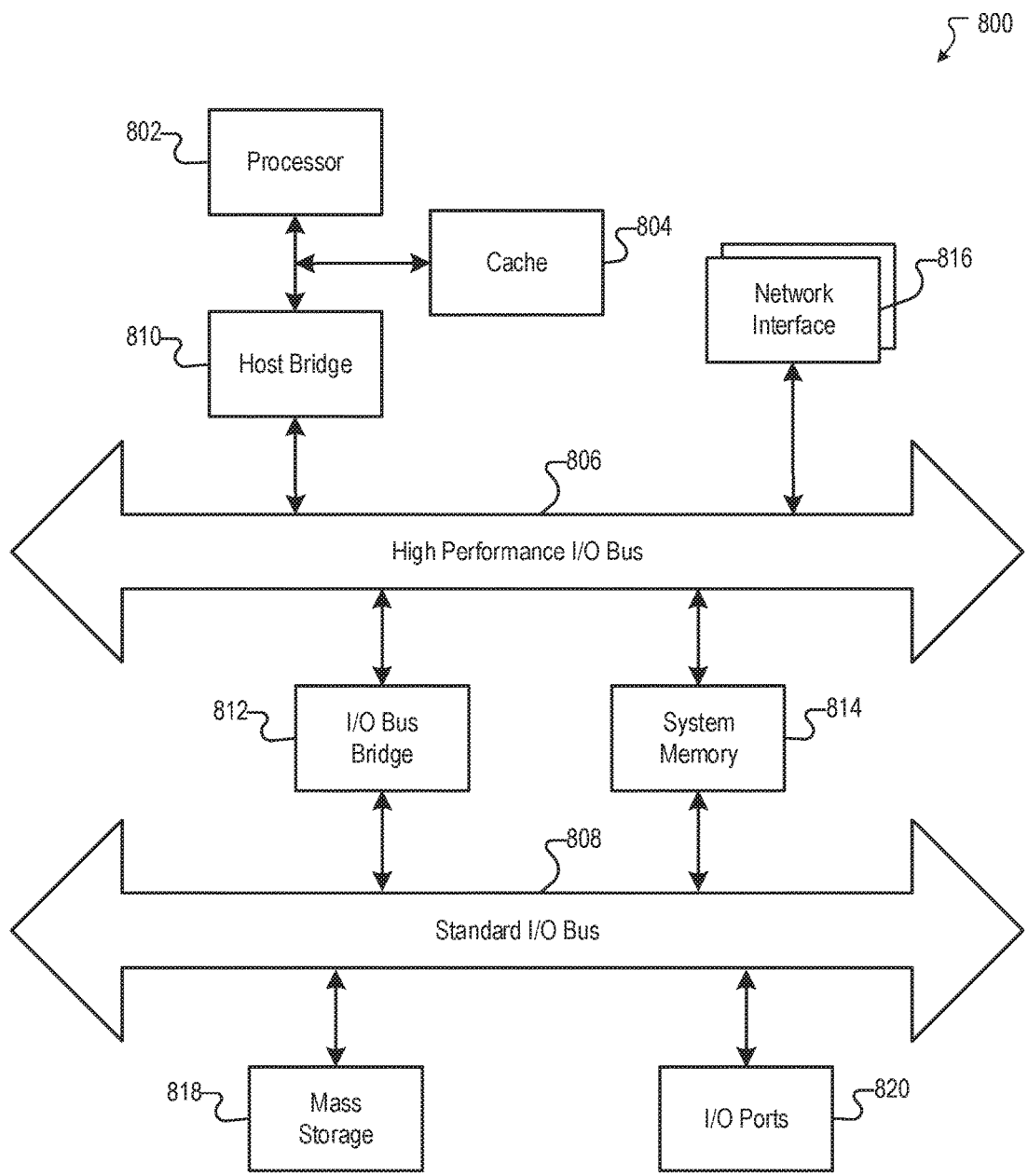
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    generating, by a social networking system, a set of candidate content items from a plurality of content items that are available in the social networking system, wherein one or more of the candidate content items are to be included in a personalized content stream for a first user, wherein at least one candidate content item to be included in the personalized content stream is selected based on the at least one candidate content item being posted by a user that is located in a geographic region in which the first user is also located or has visited;
generating, by the social networking system, a corresponding score for each of the candidate content items with respect to the first user; and
determining, by the social networking system, a first set of content items from the set of candidate content items based at least in part on the respective scores, wherein content items in the first set are included in the personalized content stream.

2. The computer-implemented method of claim 1, wherein generating a respective score for a candidate content item further comprises:
determining, by the social networking system, a likelihood of the first user selecting an option to like a candidate content item through the social networking system, the likelihood being determined using a trained machine learning model, wherein the score for the candidate content item is based at least in part on the likelihood.

3. The computer-implemented method of claim 1, wherein generating a respective score for a candidate content item further comprises:
determining, by the social networking system, a likelihood of the first user watching one or more additional content items after having viewed a candidate content item, the likelihood being determined using a trained machine learning model, wherein the score for the candidate content item is based at least in part on the likelihood.

4. The computer-implemented method of claim 1, wherein generating a respective score for a candidate content item further comprises:
determining, by the social networking system, a likelihood of the first user watching a candidate content item to completion, the likelihood being determined using a trained machine learning model, wherein the score for the candidate content item is based at least in part on the likelihood.

5. The computer-implemented method of claim 1, wherein generating a respective score for a candidate content item further comprises:
determining, by the social networking system, a likelihood of the first user watching a playback of a candidate content item for a duration of time that is longer than an average duration of time the first user watches playback of content items, the likelihood being determined using a trained machine learning model, wherein the score for the candidate content item is based at least in part on the likelihood.

6. The computer-implemented method of claim 1, wherein generating a respective score for a candidate content item further comprises:
determining, by the social networking system, a likelihood of the first user watching a playback of a candidate content item for a duration of time that is longer than an average duration of time that other users watched playbacks of the candidate content item, the likelihood being determined using a trained machine learning model, wherein the score for the candidate content item is based at least in part on the likelihood.

7. The computer-implemented method of claim 1, wherein generating the set of candidate content items further comprises:
obtaining, by the social networking system, one or more content items that were liked by at least one second user that the first user is following in the social networking system.

8. The computer-implemented method of claim 1, wherein generating the set of candidate content items further comprises:
determining, by the social networking system, that the first user has previously liked one or more content items that were posted by at least one second user; and
obtaining, by the social networking system, one or more content items that were liked by the second user.

9. The computer-implemented method of claim 1, wherein generating the set of candidate content items further comprises:
obtaining, by the social networking system, one or more content items that were posted by users that are located in a geographic region in which the first user is also located or has visited.

10. The computer-implemented method of claim 1, the method further comprising:
filtering, by the social networking system, the set of candidate content items to exclude content items that are likely to be flagged by users as being inappropriate or content items that were posted by users that have previously been flagged as posters of inappropriate content.

11. A system comprising:
at least one processor; and
a memory storing instructions that, when executed by the at least one processor, cause the system to perform:
generating a set of candidate content items from a plurality of content items that are available in the social networking system, wherein one or more of the candidate content items are to be included in a personalized content stream for a first user, wherein at least one candidate content item to be included in the personalized content stream is selected based on the at least one candidate content item being posted by a user that is located in a geographic region in which the first user is also located or has visited;
generating a corresponding score for each of the candidate content items with respect to the first user; and
determining a first set of content items from the set of candidate content items based at least in part on the respective scores, wherein content items in the first set are included in the personalized content stream.

12. The system of claim 11, wherein generating a respective score for a candidate content item further causes the system to perform:
determining a likelihood of the first user selecting an option to like a candidate content item through the social networking system, the likelihood being determined using a trained machine learning model, wherein the score for the candidate content item is based at least in part on the likelihood.

13. The system of claim 11, wherein generating a respective score for a candidate content item further causes the system to perform:
determining a likelihood of the first user watching one or more additional content items after having viewed a candidate content item, the likelihood being determined using a trained machine learning model, wherein the score for the candidate content item is based at least in part on the likelihood.

14. The system of claim 11, wherein generating a respective score for a candidate content item further causes the system to perform:
determining a likelihood of the first user watching a candidate content item to completion, the likelihood being determined using a trained machine learning model, wherein the score for the candidate content item is based at least in part on the likelihood.

15. The system of claim 11, wherein generating a respective score for a candidate content item further causes the system to perform:
determining a likelihood of the first user watching a playback of a candidate content item for a duration of time that is longer than an average duration of time the first user watches playback of content items, the likelihood being determined using a trained machine learning model, wherein the score for the candidate content item is based at least in part on the likelihood.

16. A non-transitory computer-readable storage medium including instructions that, when executed by at least one processor of a computing system, cause the computing system to perform a method comprising:
generating a set of candidate content items from a plurality of content items that are available in the social networking system, wherein one or more of the candidate content items are to be included in a personalized content stream for a first user, wherein at least one candidate content item to be included in the personalized content stream is selected based on the at least one candidate content item being posted by a user that is located in a geographic region in which the first user is also located or has visited;
generating a corresponding score for each of the candidate content items with respect to the first user; and
determining a first set of content items from the set of candidate content items based at least in part on the respective scores, wherein content items in the first set are included in the personalized content stream.

17. The non-transitory computer-readable storage medium of claim 16, wherein generating a respective score for a candidate content item further causes the computing system to perform:
determining a likelihood of the first user selecting an option to like a candidate content item through the social networking system, the likelihood being determined using a trained machine learning model, wherein the score for the candidate content item is based at least in part on the likelihood.

18. The non-transitory computer-readable storage medium of claim 16, wherein generating a respective score for a candidate content item further causes the computing system to perform:
determining a likelihood of the first user watching one or more additional content items after having viewed a candidate content item, the likelihood being determined using a trained machine learning model, wherein the score for the candidate content item is based at least in part on the likelihood.

19. The non-transitory computer-readable storage medium of claim 16, wherein generating a respective score for a candidate content item further causes the computing system to perform:
determining a likelihood of the first user watching a candidate content item to completion, the likelihood being determined using a trained machine learning model, wherein the score for the candidate content item is based at least in part on the likelihood.

20. The non-transitory computer-readable storage medium of claim 16, wherein generating a respective score for a candidate content item further causes the computing system to perform:
determining a likelihood of the first user watching a playback of a candidate content item for a duration of time that is longer than an average duration of time the first user watches playback of content items, the likelihood being determined using a trained machine learning model, wherein the score for the candidate content item is based at least in part on the likelihood.

* * * * *